United States Patent [19]
Tirtiaux et al.

[11] Patent Number: 6,072,066
[45] Date of Patent: Jun. 6, 2000

[54] FAT CRYSTALLIZATION METHOD AND APPARATUS THEREFOR

[76] Inventors: Alain Tirtiaux, rue Jean Fontaine 6, 5020 Temploux, Belgium; Chee Hong Tan, Jalan 12/7 Bukit Kayagan 5, Shah Alam, Malaysia, Malaysia

[21] Appl. No.: 09/051,598

[22] PCT Filed: Oct. 4, 1996

[86] PCT No.: PCT/BE96/00106

§ 371 Date: Apr. 14, 1998

§ 102(e) Date: Apr. 14, 1998

[87] PCT Pub. No.: WO97/14777

PCT Pub. Date: Apr. 24, 1997

[30] Foreign Application Priority Data

Oct. 19, 1995 [BE] Belgium .............................. 09500871

[51] Int. Cl.⁷ ..................................................... C11B 7/00
[52] U.S. Cl. ...................... 554/211; 23/295 R; 422/245.1
[58] Field of Search .......................... 554/211; 23/295 R; 422/245.1

[56] References Cited

U.S. PATENT DOCUMENTS 2,800,493  7/1957  Stein et al. .
3,633,883  1/1972  McGlothlin .

FOREIGN PATENT DOCUMENTS 0198538  10/1986  European Pat. Off. .
2234918   2/1991  United Kingdom .

OTHER PUBLICATIONS

Patent Abstracts of Japan, vol. 16, No. 265 (C–0951), Jun. 1992 of JP 04 063896A to N. Yamada entitled, "Apparatus for Preparing Particulate Product . . . ," dated Feb. 1992.

Patent Abstracts of Japan, vol. 15, No. 369 (C–0868), Sep. 1991 of JP 03 146595 A to N. Yamada entitled, "Production of Granular Solid Oil and Fat," dated Jun. 1991.

Database WPI, week 8342, Derwent Pub. 83–791763 of JP 58 152097A to Snow Brand Milk Products entitled, "Micro–powdery Fats Production . . . ," dated Sep. 1983.

Database WPI, week 9048, Derwent Pub. 90–360315 of SU 1 558 970A to A. Garabekgan et al. entitled, "Fat Crystallizing Set . . . ," dated Apr. 1990.

V.A. Tirtiaux, "Trockene Mehrfachfraktionierung–Ein Kostengünstiges Unwandlungsverfahren" in FETT Wissenshaft Technologie, vol. 93, No. 11, 1991, pp. 432–439.

*Primary Examiner*—Deborah D. Carr
*Attorney, Agent, or Firm*—Watson Cole Grindle Watson, P.L.L.C.

[57] ABSTRACT

Process for crystallizing fatty substances for their subsequent fractionation especially by pressure filtering, consisting in particular in melting the fatty substances, dividing the molten mass into beads, feeding these beads into a pre-refrigerated aqueous solution, adjusting the concentration of the fatty substance relative to the aqueous solution, adjusting the feed rate of said beads, adjusting the temperature of the beads/solution mixture, maintaining said mixture temperature until the crystallization of each bead has completely stabilized, subsequently transferring the beads/solution mixture to the filtration location, separating the fatty substance beads under a low pressure from the aqueous solution, and finally extracting from said fatty substance beads, under high pressure, the liquid portion of the fatty substance, and apparatus for applying this process.

31 Claims, 4 Drawing Sheets

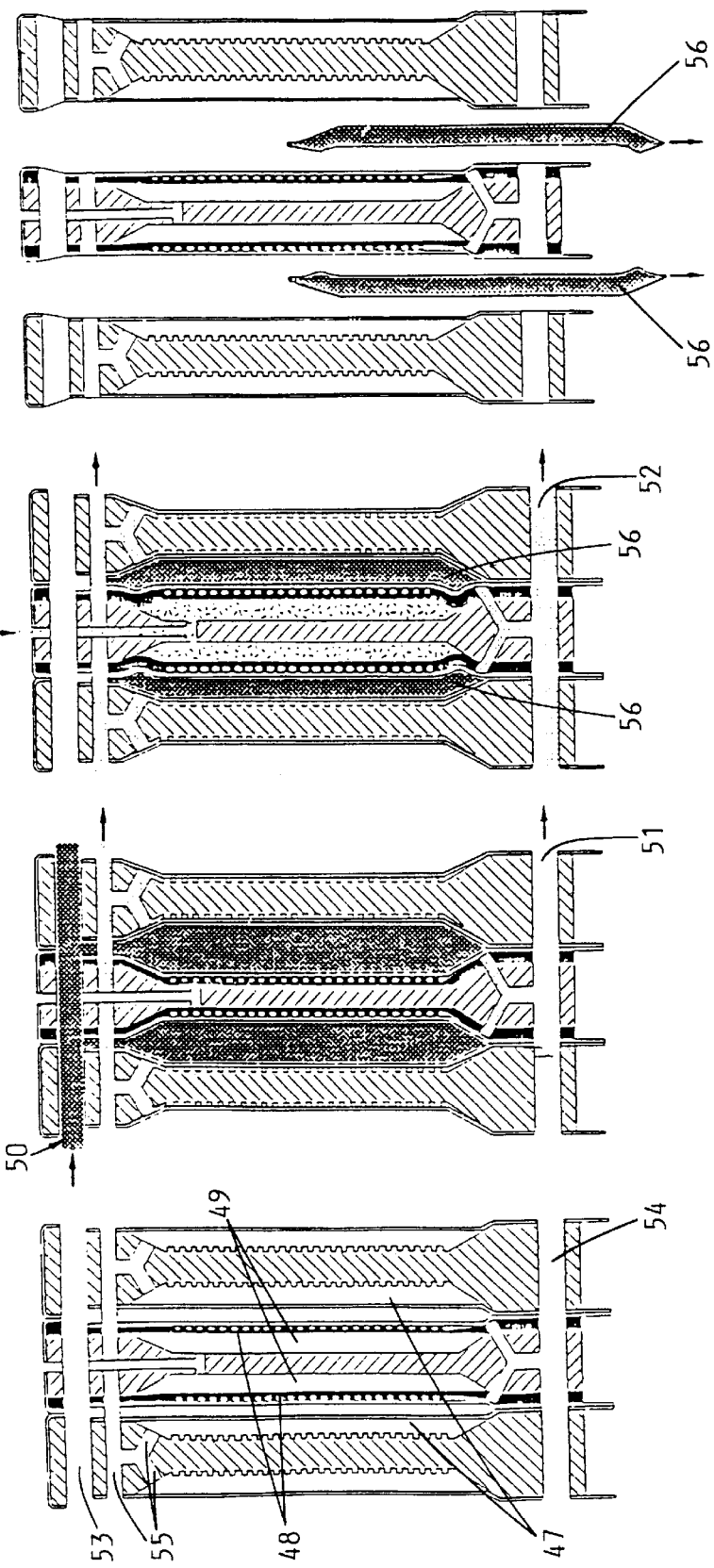

FAT CRYSTALLIZATION METHOD AND APPARATUS THEREFOR

This application is a 371 of PCT/BE96/00106 filed Oct. 4, 1996.

The present invention relates to a process for crystallising fatty substances, in particular lauric fats and lauric or non-lauric fatty acids for their subsequent fractionation especially by pressure filtering.

In the field of nutrient fats, the area relating to the total or partial substitution of cacao butter is the subject of many research, this being mainly due to the high price of cacao butter, the main characteristic of which resides in its capacity to melt entirely at the human body temperature while still remaining sufficiently solid and manageable there below. The main use of cacao butter is in confectionery and in chocolate-factory, but the excipient market in pharmacology is not negligible.

The substitution products for cacao butter are classified in two large categories, depending whether they are of the lauric or nonlauric type, i.e. according to whether they are produced starting from fats which are rich in lauric fatty acids or not.

The invention relates in particular to substitution products of the lauric type and more particularly to fats, rather than to oils, since the physical characteristics of the concerned products range generally within those of the category of fats.

However, the invention also relates to the production of fractionated fatty acids of the lauric or non-lauric type which may substitute, at a lower cost, the distilled fatty acids.

The fat which is used the most for manufacturing a substitute of the lauric type is indisputably palm fat, which is extracted from palm nut kernels. Other exotic fats, such as coconut oil, karite nut fat, fats originating from cuphea, babassu, mangue or sal kernels can also be used.

With respect to palm fat, in order to obtain, starting therefrom, a product which is similar to cacao-butter, the palm fat is fractionated in order to withdraw a solid portion thereof. Starting from palm fat with a iodine number of about 17 to 19, the object of the fractionation is to obtain a solid portion with a iodine number not higher than 7. In this field, the use of the iodine number, i.e. of the measurement of the insaturation degree of the fat, is quite widespread because it is quickly done and gives a good approximation of the product quality. Other analyses relative to the composition of the products and to their physical behaviour are used for a sharper definition.

For doing this, the processes for fractionating fatty substances which are used nowadays are of four different types, namely:

A process according to which the fatty substance is admixed with a solvent, in general acetone. Then, the miscella is refrigerated by convection or evaporation until germination and growth of crystals occur within the miscella. After stabilisation of these crystals by tempering, they are separated from the fluid portion by filtration, decantation or by another separation process.

A process according to which the fatty substance is crystallised, without solvent, by cooling down and subsequently admixed with a surfactant which allows to separate the crystallised portion by centrifugation, this process being known under the denomination Lanza process.

A process according to which the fatty substance is crystallised and solidified in trays placed in a cold chamber or conveyed into refrigeration tunnels, the plates of solidified fatty substance being then introduced into filtering bags which are subsequently stacked up in the cage of a hydraulic press. Thanks to the available high pressure, the soft portion of the fatty substance is exuded until the quality of the rigid part thereof which remains within the press is as desired. The filtering bags are then unstacked and the cakes formed by said rigid part are demolished.

A process according to which the fatty substance is partially solidified in a crystallisation vessel until the point that the fatty substance is in the super-cooling state, at the limit of the pumping possibilities. It is then fed by pumping into the chambers of a filter press equipped with plates with refrigerated walls and provided with membranes. After having fed the fatty substance into the filter, this filter is left the time which is necessary for its solidification and for the stabilisation of the crystalline phase. Then, an important pressure, of 25 to 70 bars according to the case, is applied onto the backside of each membrane in order to exude the fluid portion from the fatty substance. The pressure is then relieved and the filter is opened for demolishing the solid material cakes.

From these four known processes, it is the last one which is developing the most, taken into account the fact that the costs for the first three processes are high, namely: in the first process, energy costs caused by the recovery of the solvent and costs for replacing the lost solvent; for the second process, costs for the surfactant and costs for the loss of fatty substance and, for the third process, costs of labour.

However, notwithstanding the advantages that it shows with respect to the first three processes, the fourth aforementioned known process causes also difficulties with respect to the control of the fatty substance crystallisation and with respect to the transfer of the crystallised mass into the filter to fill all of the chambers and to avoid plates braking by compression onto empty or partially empty filter chambers.

An object of the invention is to provide a simple and efficient solution to the aforesaid difficulties which arise when carrying out the above mentioned fourth process.

To this end, the process according to the invention consists in melting the fatty substance, dividing the molten mass into beads which are as homogeneous as possible and which have dimensions as regular as possible, feeding these beads into an aqueous solution refrigerated previously to a temperature lower than the melting point of the fatty substance, adjusting the concentration of the fatty substance relative to the aqueous solution in function of the capacity of this solution to absorb the amount of heat required for solidifying the fatty substance beads, controlling the feed rate of said beads into said solution in order that each fatty substance bead is subjected instantaneously to a beads/aqueous solution heat exchange which causes the surface of the beads to solidify quickly and progressively the entire mass thereof, maintaining the fatty substance beads in suspension in said aqueous solution, adjusting the temperature of the beads/solution mixture to enable the crystallisation of each bead to stabilise, maintaining said mixture temperature until said crystallisation is completely stabilised, subsequently transferring the beads/solution mixture to the filtration location whose surfaces which come into contact with said mixture are kept at a temperature near the temperature of the mixture, separating the fatty substance beads under a low pressure from the aqueous solution, and finally extracting from said fatty substance beads, under a high pressure, the liquid portion of the fatty substance.

A further object of the invention is an apparatus for carrying out said process.

According to the invention, this apparatus comprises a crystallisation chamber connected to a source of molten fatty substance, to a source of aqueous solution adapted to make the temperature of the solution adjustable and to a filter press equipped with plates the walls of which being arranged to be suited for being brought to a determined temperature, means disposed within the chamber, near the location where the molten fatty substance is fed therein, and arranged to divide this fatty substance into beads, means arranged for controlling the feed rate of the molten fatty substance in the chamber and the concentration of the fatty substance beads into the aqueous solution, means arranged within the chamber for maintaining the fatty substance beads in suspension in the aqueous solution, means provided within the chamber and connected to an external source of cooling fluid, which means are arranged for maintaining the temperature of the fatty substance beads/aqueous solution mixture at a determined value, and means arranged to enable said mixture to be transferred from the chamber to the filter.

Other details and particularities of the invention will become apparent from the description of the drawings annexed to the present text and which illustrate, by way of non-limitative examples, the process according to the invention and show the apparatus for carrying out this process.

FIGS. 6, 7, 8 and 9 are schematic elevational and sectional views of a filtering element of the apparatus according to the invention, FIG. 6 showing this element empty and awaiting the supply of said fat beads/aqueous solution mixture, FIG. 7 showing this supply whilst FIGS. 8 and 9 show respectively the compactation of said mixture and the discharge of the solid material cakes.

In the different figures, the same reference numerals indicate identical or analogous elements.

Figure 1:
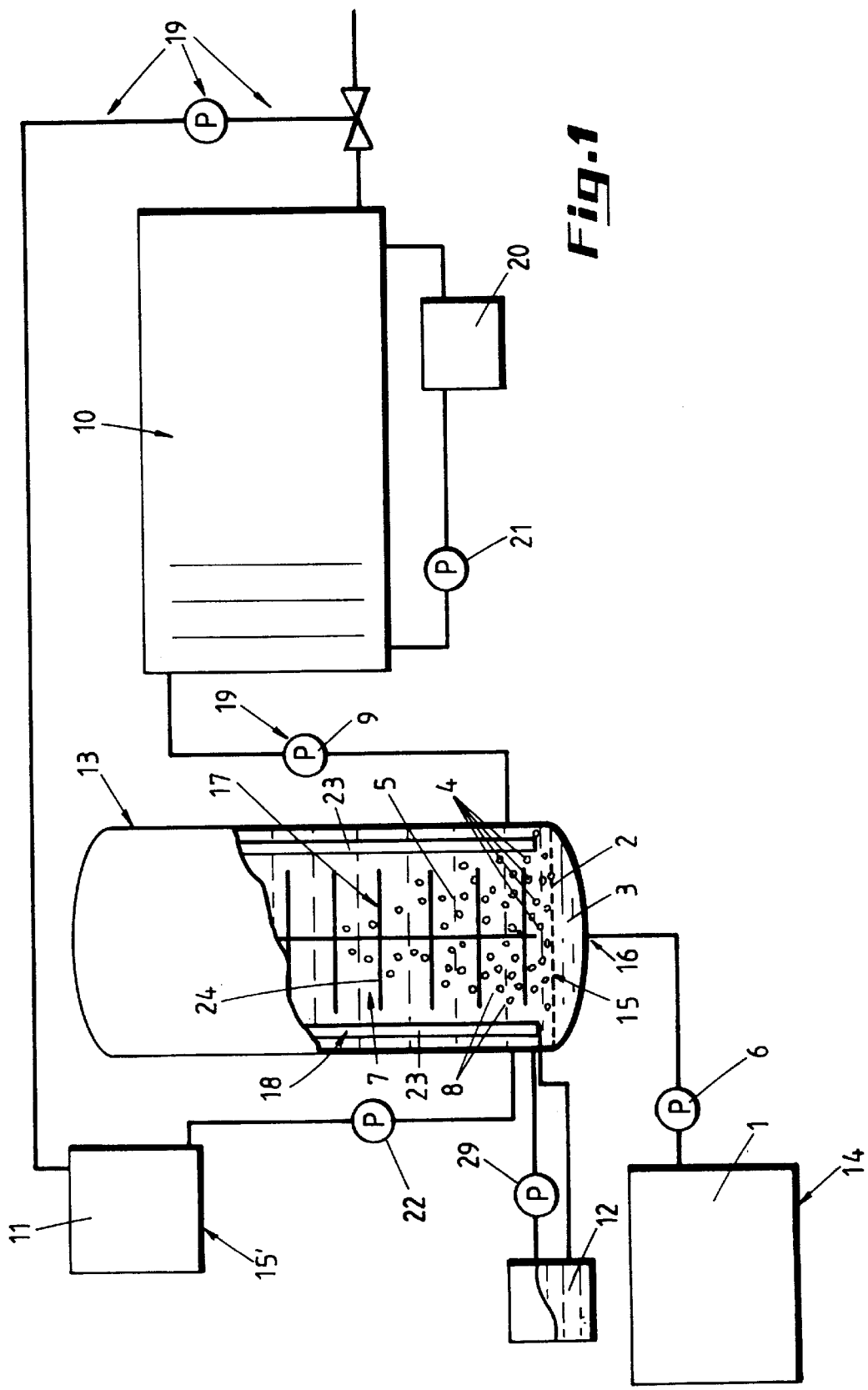
FIG. 1 is a very schematic view which illustrates the process and shows the apparatus according to the invention.

First of all, one will notice that, within the scope of the present invention, the expression "fatty substance" has a meaning which is as large as possible and which will comprise consequently as well fats containing fatty acids as fatty acids as such, whether these fats and fatty acids are of the lauric or non-lauric nature. However, as was set forth already previously, the process of the invention is particularly suited for the treatment of lauric fats and lauric or non-lauric fatty acids.

The process according to the invention illustrated in the drawings is more particularly destined for crystallising fats of the lauric type, in an aqueous solution, in view of their later fractionation by pressure filtering, with recovery of this aqueous solution during the filtering. This process consists first of all, in 1, in melting the fats and in dividing, in 2, the molten fatty mass 3 into beads 4 which are as regular as possible and which are fed in an aqueous solution 5 previously refrigerated to a temperature lower than the one of the melting point of the fat. The concentration of the fat beads relative to the aqueous solution is adjusted in function of the capacity thereof to absorb the necessary amount of heat for solidifying the fat beads and, in 6, the feed rate of the beads 4 in the solution 5 is controlled so that each fat bead is instantaneously subjected to a beads/aqueous solution heat exchange which causes the surface of the beads to solidify quickly and the entire mass thereof progressively. The fat beads are kept in suspension, in 7, in the aqueous solution and the temperature of the beads/solution mixture 8 is adjusted to enable the crystallisation of each bead to stabilise and this mixture temperature is maintained, in 7, until said crystallisation is completely stabilised. Then, the beads/solution mixture is transferred, for example by pumping 9, to the filtering location 10 whose surfaces which come into contact with said mixture are kept at a temperature near the temperature of this mixture. First of all, the fat beads are separated, under a low pressure, from the aqueous solution and then the liquid portion of the fat is finally extracted, under a high pressure, from said fat beads.

In the process illustrated in FIG. 1, the fat beads 4 are crystallised discontinuously by feeding, in 7 in order to form the beads/aqueous solution mixture, a given volume of fat beads in a given volume of aqueous solution, which is prepared in 11 where it is recycled after filtering of said mixture. After having composed said mixture, it is maintained, as set forth hereinabove, in 7, until the crystallisation of the fat beads is completed. Only when this crystallisation is stabilised, the mixture is transferred to the filtering location.

According to the invention, one could also provide to crystallise the fat beads of said mixture continuously and this by circulating the refrigerated aqueous solution in counter-current with respect to the flux of the fat beads until the crystallisation of said beads, which are kept in suspension in the aqueous solution, is stabilised. An advantageous way for doing this would be to feed the molten fat at the bottom of a vertical column, through a device for dividing the fat into beads as illustrated by any one of the FIGS. 2, 3, 4 or 5. Through the vertical column flows then a flux of aqueous solution, going from the top towards the bottom of the column in a continuous or pulsed way. The formed and progressively solidified beads are thus moved upwards due to their specific, weight which is lower than that of the solution. The beads/solution mixture flows then over, at the top of the column, into a stabilisation vessel. When the crystallisation is stabilised, the beads/aqueous solution mixture is directed towards a battery of filters where the filters are filled and actuated one by one so as to separate the aqueous solution, by pressure, from the fat beads, these beads being then put under pressure so that their liquid portion is exuded.

In the process illustrated in FIG. 1, there is fed in 7, i.e. in a crystalliser, an amount of aqueous solution which is determined by the desired concentration of the mixture formed by this solution and the fat beads 4 which will be fed therein, the temperature of the aqueous solution being adjusted, prior to this feeding, to a temperature lower than that of the melting point of the fat. For palm fat, the temperature of the aqueous solution will be comprised between 5° and 27° C. and preferably between 8° and 20° C. The fat is fed into this aqueous solution in the form of homogeneous beads, the diameter of which is comprised between 0.1 and 5 mm, but which is preferably situated between 1 and 3 mm. The aforementioned concentration of the fat beads relative to the aqueous solution will be from 10 to 70%, and will preferably be comprised, for palm fat, between 20 and 50%. The fat beads are kept in suspension in the aqueous solution by a stirring movement until the feeding of said beads into this solution is stopped. Once the beads/aqueous solution mixture is formed, its temperature is kept between 10° and 23° C., and preferably between 17° and 20° C., such as to stabilise the crystallisation of each bead of the mixture. Keeping the mixture at temperature is done by controlling, in a precise way, the temperature of said mixture through that of a cooling liquid 12 and takes between 2 and 24 hours, and preferably, for palm fat, from 4 to 10 hours. When the beads/aqueous solution mixture has been kept for the desired period at temperature, it can easily be transferred either by pumping, as shown in FIG. 1, or by pressure difference, into the filter 10 which will be described hereinafter and which has previously been brought to a temperature close to that of the mixture; in the filter, the aqueous solution will first of all be separated from the mixture at a pressure comprised between 1 to 4 bars, so as to be recovered in 11, the liquid portion of the fat beads being then exuded at a pressure comprised between 15 to 70 bars and preferably, for palm fat, of 20 to 40 bars.

As aqueous solution use can simply be made of water but in order to avoid, on one hand, an untimely saponification of the free fatty acids contained in the fat and, on the other hand, a mutual agglomeration of the fat beads, an aqueous solution is provided which contains an acid and a surfactant. Before feeding the fat beads in the solution, this acid is dosed therein to obtain a pH situated between 6.8 and 7.0 and this weak acidity of said solution is maintained. Preference will be given, for its anti-oxidising effect, to citric acid although there would not be any inconvenient in using other, more economical acids. As to the surfactant, there will be chosen advantageously, for palm fat, an emulsifier of the anionic, cationic or zwitterionic or non ionic type.

According to the invention and as shown in the drawings, the apparatus for carrying out said process comprises a crystallisation chamber 13 connected to a source 14 of molten fatty substances, to a source 15' of aqueous solution adapted to make the temperature of the solution adjustable and to a filter press 10 equipped with plates the walls of which being arranged to be suited for being brought to a determined temperature. Means 15 are disposed within the chamber 13, near the location 16 where the molten fatty substance is fed therein, and arranged to divide this fatty substance into beads 4. Means 6 are arranged for controlling, on the one hand, the feed rate of the molten fat in the chamber 13 and, on the other hand, the concentration of the fat beads in the aqueous solution. Means 17 are arranged within the chamber 13 for maintaining the fat beads in suspension in the aqueous solution, whilst means 18 are provided within the chamber and connected to an external source 12 of cooling fluid, for maintaining the temperature of the fat beads/aqueous solution mixture at a determined value, means 19 being arranged for transferring said mixture from the chamber 13 into the filter 10, the walls of which are tempered by a cooling fluid contained in a tank 20 and circulated by a pump 21. Means 22 are moreover provided for recycling the aqueous solution, which has been separated in the filter from the fat beads, towards the source 15' of aqueous solution.

Figure 2:
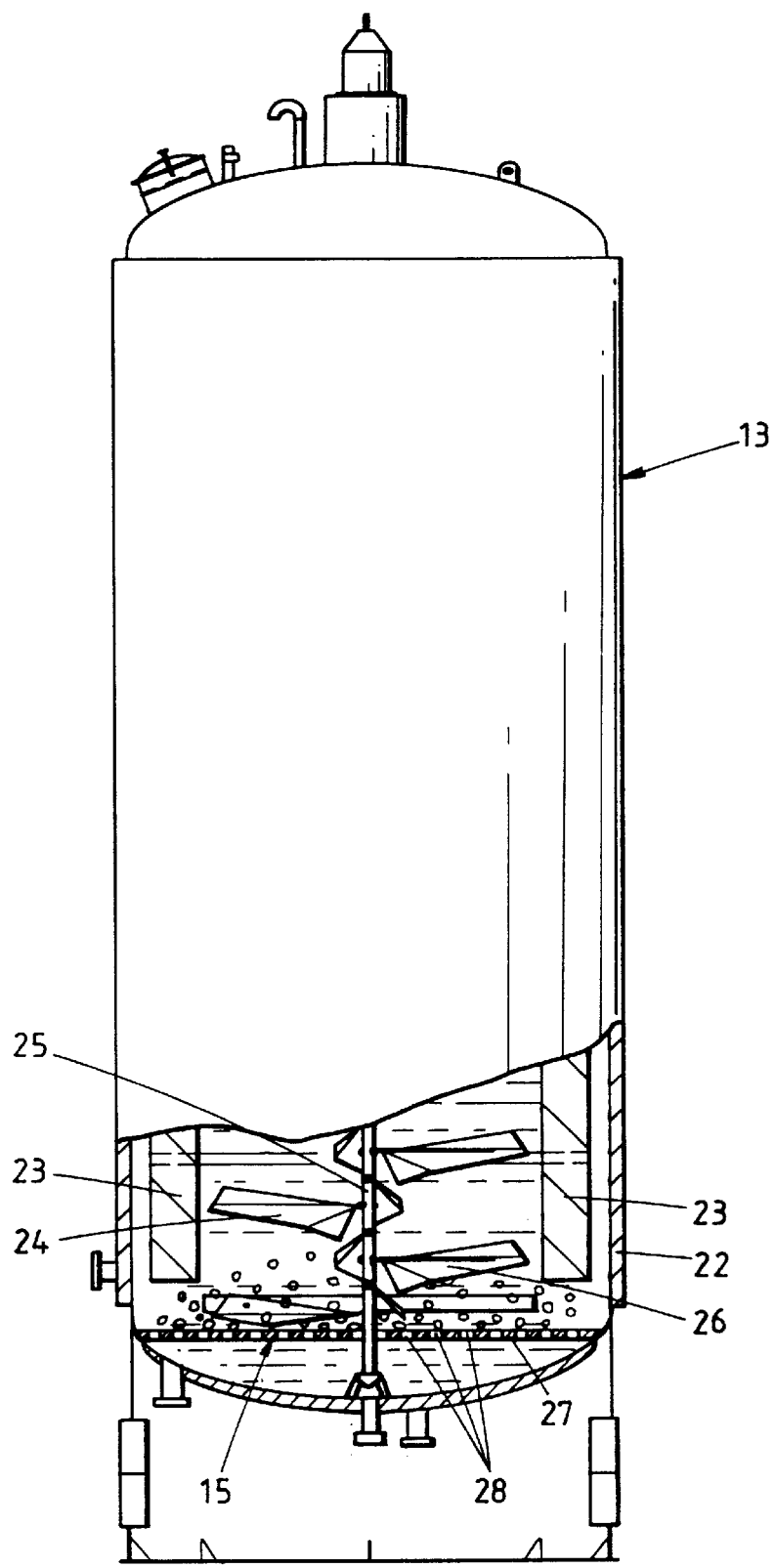
FIG. 2 is a schematic elevational view with partial cutaways of the crystallisation vessel of the above mentioned apparatus.

Although use could be made of no matter what type of crystallisation chamber, it is advantageous to use a crystallisation chamber 13 shown in FIGS. 1 and 2 which is of the cylindrical vessel type with a vertical axis and an insulated wall 22, wherein the molten fatty substance is fed at the bottom, in 16, which vessel comprises, over an important portion of its height, on the one hand, a heat exchanger 23 which is co-axial to the vessel and which forms said means 18 for maintaining the temperature of the fat beads/aqueous solution mixture at a determined value and, on the other hand, an agitator 24 formed by a shaft mounted on the vessel so that the axis of its shaft 25 coincides with the vessel axis. Blades 26, which are preferably directional, are regularly distributed according to the longitudinal direction of the shaft and according to planes passing through the axis of this shaft, said agitator forming said means 17 for maintaining the fat beads in suspension in the aqueous solution. Said means 15, arranged for dividing the molten fat into beads, are formed in the chamber 13, as shown in FIGS. 1 and 2, by a regularly perforated plate 27 which is fixed, by its circumference, into the lower portion of the vessel to the inner wall thereof, this plate 27 which is flat and perpendicular to the vessel axis, could, according to the invention, also be arched, either convex or concave, the dimensions of the perforations 28 being chosen in function of the desired volume of the beads 4. The cooling liquid, which circulates in the heat exchanger 23, is constantly controlled with respect to both its temperature and its flow rate by means of the pump 29. Most often, this liquid will be water or, when required by the temperature, a mixture of water and propylene glycol.

Figure 3:
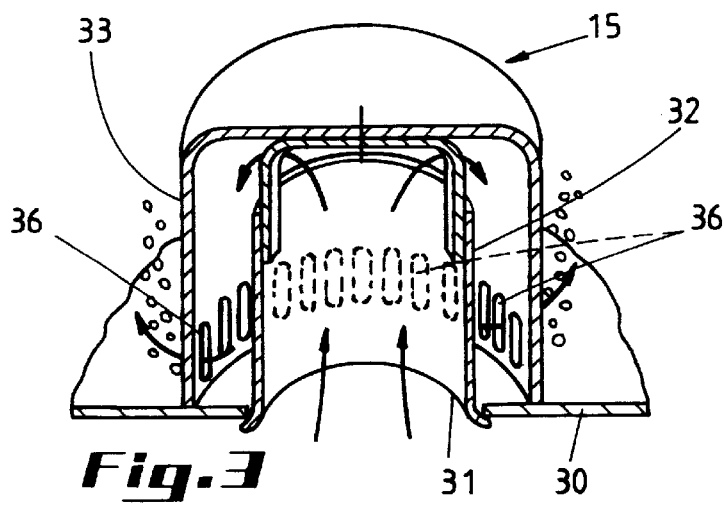
FIGS. 3, 4 and 5 are perspective detail views with partial cutaways showing variants of the crystallisation vessel shown in FIG. 2.
Figure 4:
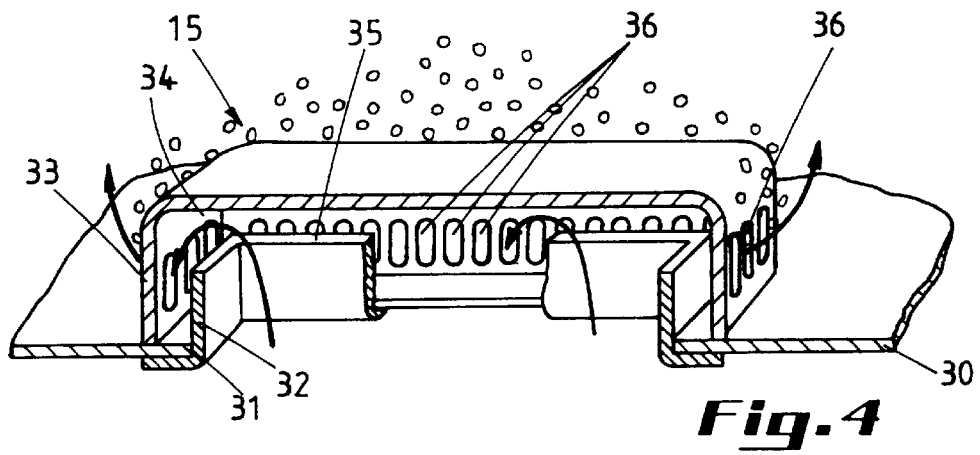
Figure 5:
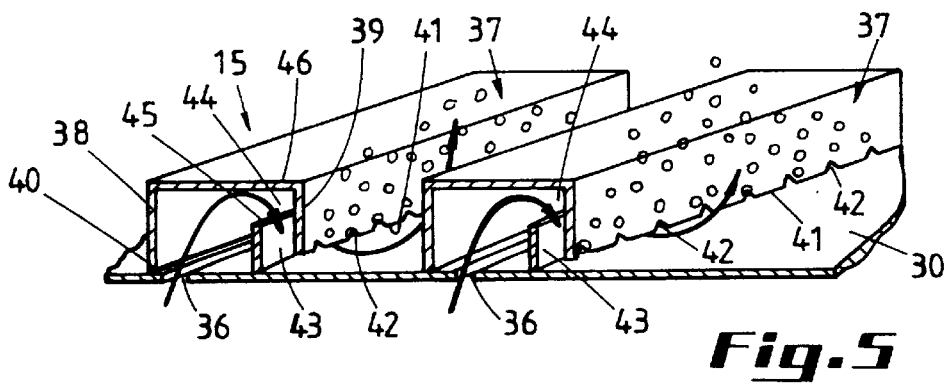

As shown in FIGS. 3 and 4, the aforementioned means 5, arranged for dividing the molten fat into beads, may also be of the circular or longitudinal bell-type and disposed onto a plate 30 fixed within the vessel at right angles to the axis thereof and provided with a central opening 31. A duct 32, which is open at its both extremities, is fixed to the circumference of this opening 31 so as to extend above said plate 30, a bell 33, also fixed to this plate, capping the duct 32 in such a way that a space 34 remains between the upper extremity 35 of said duct and the bell 33, this bell being regularly perforated 36, over its entire circumference, in the zone thereof comprised between the level of the plate 30 and that of the upper part of the duct 32. As shown in FIG. 5, these means 15 could also be formed by a flat plate 30 fixed within the vessel at right angles to the axis thereof and showing parallel elongated openings 36. Each of these openings 36 is capped by a box 37 having a U-shaped section with unequal heights of the flanges 38 and 39, this box being fixed to the upper side of the plate 30 by the free edge 40 of its longest flange 38 whilst the free edge 41 of its shortest flange 39 shows notches 42 which are regularly divided over its entire length. This box 37 comprises between the two flanges 38 and 39 of the U-shape and parallel thereto a flat vertical partition 43 fixed to said plate and disposed between said elongated opening 36 and the lowest flange 39 of the U-shape, the height of this partition 43 being such that a space 44 remains between its upper edge 45 and the web 46 of the U.

The filter 10, one element of which is schematically shown in FIGS. 6 to 9, is a chambered plate filter-press known per se, each filter element chamber 47 being provided with a flexible membrane 48 behind which, in 49, it is possible to feed a pressurised fluid.

The operation sequences of the filter are as follows

Feeding of the filter with fat beads/aqueous solution mixture, in 50 (FIG. 7), filtering from the mass the fat beads in suspension, then increasing the pressure to a pressure of 1 to 4 bars in order to extract the aqueous solution which is immediately recovered, in 51, so as to be reused in 11.

Compacting each chamber 47 by bringing the back of each membrane 48 at a pressure comprised between 15 and 70 bars, during which the liquid portion of the fat is exuded, in 52, and leaves in each chamber 47 a product cake 56 with a high melting point (FIG. 8).

Blowing the beads/aqueous solution mixture feeding ducts 53.

Blowing the filtrate outlet ducts 54.

Evacuating the circuit 55 for pressurising the membranes 48.

Demolishing the cakes 56 (FIG. 9).

Closing the filter and preparing it for the transfer of a new amount of said, after a possible washing cycle.

It has to be understood that the invention is in no way limited to the described embodiments and that many modifications could be applied thereto without leaving the scope of the present patent.

Of course, any fatty substance other than a lauric fat could be treated in the same way or in a way substantially similar to the illustrated process. It is so that the use of the aqueous solution composed of water and an acid for avoiding saponification of the free fatty acids of the fat is to be conceived of course only in the case of the treatment of a fat.

What is claimed is:

1. A process for crystallising fatty substances, in particular lauric fats and lauric or non-lauric fatty acids for their subsequent fractionation especially by pressure filtering, characterized in that it consists in melting the fatty substances, dividing the molten mass into beads which are as homogeneous as possible and which have dimensions as regular as possible, feeding these beads into an aqueous solution refrigerated previously to a temperature lower than the melting point of the fatty substance, adjusting the concentration of the fatty substance relative to the aqueous solution in function of the capacity of this solution to absorb the amount of heat required for solidifying the fatty substance beads, controlling the feed rate of said beads into said solution in order that each fatty substance bead is subjected instantaneously to a beads/aqueous solution heat exchange which causes the surface of the beads to solidify quickly and progressively the entire mass thereof, maintaining the fatty substance beads in suspension in said aqueous solution, adjusting the temperature of the beads/solution mixture to enable the crystallisation of each bead to stabilise, maintaining said mixture temperature until said crystallisation is completely stabilised, subsequently transferring the beads/solution mixture to the filtration location whose surfaces which come into contact with said mixture are kept at a temperature near the temperature of the mixture, separating the fatty substance beads under a low pressure from the aqueous solution, and finally extracting from said fatty substance beads, under a high pressure, the liquid portion of the fatty substance.

2. A process according to claim 1, characterised in that the fatty substances are crystallised discontinuously by feeding a given fatty substance beads volume into a given aqueous solution volume.

3. A process according to claim 1, characterised in that the fatty substances are crystallised continuously by circulating said aqueous solution in counter-current with respect to the flux of fatty substance beads.

4. A process according to claim 1, characterised in that the molten fatty substance mass is divided into beads having a diameter comprised between 0.1 and 5 mm.

5. A process according to claim 4, characterised in that the diameter of the beads is comprised between 1 and 3 mm.

6. A process according to claim 1, characterised in that the beads of fatty substance, such as palm fat, are fed into an aqueous solution whose temperature is comprised between 5 and 27° C.

7. A process according to claim 6, characterised in that the temperature of the aqueous solution is comprised between 8 and 20° C.

8. A process according to claim 1, characterised in that said aqueous solution consists of water.

9. A process according to claim 6, characterised in that, in order to avoid saponification of the free fatty acids contained in the fat beads, said aqueous solution is composed of water and an acid.

10. A process according to claim 9, characterised in that, before feeding the fat beads into the aqueous solution, the acid is dosed in the water so that the pH of this solution is comprised between 6.8 and 7.0.

11. A process according to claim 9, characterised in that use is made, for its anti-oxidising effect, of citric acid.

12. A process according to claim 1, characterised in that, in order to maintain the homogeneity of each fatty substance bead in the aqueous solution and to avoid mutual agglomeration of these beads, said aqueous solution comprises a surfactant.

13. A process according to claim 12, characterised in that there is chosen, as surfactant, an emulsifier of the anionic, cationic of zwitterionic or non-ionic type.

14. A process according to claim 1, characterised in that the fatty substance beads are kept in suspension in the aqueous solution, by agitating the beads/solution mixture.

15. A process according to claim 6, characterised in that, during the crystallisation of the fat beads, the temperature of the fat beads/aqueous solution mixture is maintained between 10° and 23° C.

16. A process according to claim 15, characterised in that the temperature of the fat beads/aqueous solution mixture is maintained between 17° and 20° C.

17. A process according to claim 1, characterised in that the fatty substance beads are fed in such an amount in the aqueous solution that a concentration of 10 to 70% of fatty substance relative to said aqueous solution is obtained.

18. A process according to claim 17, characterised in that the amount of fatty substance beads fed into the aqueous solution is such that said concentration is comprised between 20 and 50%.

19. A process according to claim 1, characterised in that, in order to assure the total solidification of said beads, the temperature of the fatty substance beads/aqueous solution mixture is maintained for a period comprised between 2 and 24 hours.

20. A process according to claim 19, characterised in that the period for which the temperature of the mixture is maintained is comprised between 4 and 10 hours.

21. A process according to claim 1, characterised in that the aqueous solution is separated, by filtering, from the fatty substance beads at a pressure comprised between 1 to 4 bars.

22. A process according to claim 1, characterised in that, after having separated the fatty substance beads from said solution, the fatty substance beads are subjected to a pressure comprised between 15 and 70 bars so as to exude and filter the liquid portion of the fatty substance leaving as residue a product cake with a high melting point.

23. A process according to claim 22, characterised in that the pressure at which the fatty substance beads are subjected is comprised between 20 and 40 bars.

24. A process according to claim 1, characterised in that the aqueous solution is recycled after having separated it from said fatty substance beads/aqueous solution mixture.

25. An apparatus for crystallizing fatty substances which comprises a crystallisation chamber (13) connected to a source (14) of molten fatty substances, to a source (15') of aqueous solution adapted to make the temperature of the solution adjustable and to a filter press (10) equipped with plates, the walls of which are arranged to be suited for being brought to a determined temperature, means (15) disposed within the chamber (13) near the location (16) where the molten fatty substance is fed therein, and arranged to divide this fatty substance into beads, means (6) arranged for controlling the feed rate of the molten fatty substance in the chamber (13) and the concentration of the fatty substance beads into the aqueous solution, means (17) arranged within the chamber (13) for maintaining the fatty substance beads (4) in suspension in the aqueous solution, means (18) provided within the chamber and connected to an external source (12) of cooling fluid, which means are arranged for maintaining the temperature of the fatty substance beads/aqueous solution mixture at a determined value, and means (19) arranged to enable said mixture to be transferred from the chamber to the filter.

26. An apparatus according to claim 25, characterised in that the filter and the aqueous solution source comprise means (22) arranged for allowing the filtered aqueous solution to be recycled.

27. An apparatus according to claim 25, characterised in that said crystallisation chamber (13) is of the cylindrical vessel type with a vertical axis and an insulated wall (22) wherein the molten fatty substance is fed at the bottom, which vessel comprises, over an important portion of its height, on the one hand, a heat exchanger (23) which is co-axial to the vessel and which forms said means (18) for maintaining the temperature of the fatty substance beads/aqueous solution mixture at a determined value and, on the other hand, an agitator (24) formed by a shaft (25) mounted on the vessel so that its axis coincides with the vessel axis, blades (16), which are preferably directional, being regularly distributed according to the longitudinal direction of the shaft (25) and according to planes passing through the axis of this shaft, said agitator forming said means (17) for maintaining the fatty substance beads in suspension in the aqueous solution.

28. An apparatus according to claim 27, characterised in that said means (15), arranged for dividing the molten fatty substance into beads, are formed by a regularly perforated plate (27) which is fixed, by its circumference, into the lower portion of the vessel to the inner wall thereof, this plate (27) being either flat and perpendicular to the vessel axis, or arched convex or concave, the dimensions of the perforations (28) being chosen in function of the desired bead volume.

29. An apparatus according to claim 27, characterised in that said means (15), arranged for dividing the molten fatty substance into beads (4), are of the circular or longitudinal bell-type and disposed onto a plate (30) fixed within the vessel at right angles to the axis thereof and provided with a central opening (31), a duct (32), which is open at its two extremities, being fixed to this opening (31) so as to extend above said plate (30), a bell (33), also fixed to this plate, capping the duct (32) in such a way that a space (34) remains between the upper extremity (35) of said duct and the bell (34), this bell being regularly perforated, (in 36), over its entire circumference in the zone thereof comprised between the level of the plate (30) and that of the upper part (35) of the duct (32).

30. An apparatus according to claim 27, characterised in that said means arranged for dividing the molten fatty substance into beads comprise a flat plate fixed within the vessel at right angles to the axis thereof and showing parallel elongated openings (36), each of these openings being capped by a box (37) having a U-shaped section with unequal heights of the flanges (38, 39), this box being fixed to the upper side of the plate (30) by the free edge (40) of its longest flange (38) whilst the free edge (41) of its shortest flange (39) shows notches (42) which are regularly divided over its entire length, said box (37) comprising between the two flanges of the U-shape and parallel thereto a flat partition (43) fixed to said plate and disposed between said elongated opening (36) and the lowest flange (39) of the U-shape, the height of this partition (43) being such that a space (44) remains between its upper edge (45) and the web (46) of the U.

31. An apparatus according to claim 25, characterised in that the filter (10) is of the filter-press type equipped with membrane plates known per se.

* * * * *